United States Patent [19]

Im et al.

[11] Patent Number: 5,646,957
[45] Date of Patent: Jul. 8, 1997

[54] BURST UPDATE FOR AN ADAPTIVE EQUALIZER

[75] Inventors: Gi-Hong Im, Middletown; Naresh Ramnath Shanbhag, Scotch Plains; Jean-Jacques Werner, Holmdel, all of N.J.

[73] Assignee: Lucent Technologies Inc., Murray Hill, N.J.

[21] Appl. No.: 508,945

[22] Filed: Jul. 28, 1995

[51] Int. Cl.$^6$ .................................................. H03H 7/40
[52] U.S. Cl. ........................... 375/233; 375/234; 375/235; 364/724.2
[58] Field of Search ...................... 375/229, 230, 375/266, 233, 350, 348, 346, 343, 235, 232, 234; 364/724.01, 724.19, 724.2; 329/349, 350

[56] References Cited

U.S. PATENT DOCUMENTS

| | | | |
|---|---|---|---|
| 4,247,940 | 1/1981 | Mueller et al. | |
| 4,304,962 | 12/1981 | Fracassi et al. | 380/42 |
| 4,466,108 | 8/1984 | Rhodes | 375/329 |
| 4,475,211 | 10/1984 | Mattis, Jr. et al. | 375/235 |
| 4,567,599 | 1/1986 | Mizoguchi | 375/232 |
| 5,068,873 | 11/1991 | Murakami | 375/231 |
| 5,155,742 | 10/1992 | Ariyavistakul et al. | 375/231 |
| 5,164,962 | 11/1992 | Nakai et al. | 375/231 |
| 5,173,925 | 12/1992 | Mizoguchi | 375/232 |
| 5,175,747 | 12/1992 | Murakami | 375/232 |
| 5,210,774 | 5/1993 | Abbiate et al. | 375/232 |
| 5,272,446 | 12/1993 | Chalmers et al. | 329/304 |
| 5,282,228 | 1/1994 | Scott et al. | 375/344 |
| 5,293,401 | 3/1994 | Serfaty | 375/231 |
| 5,311,546 | 5/1994 | Paik et al. | 375/232 |
| 5,355,092 | 10/1994 | Kasaka et al. | 329/304 |

FOREIGN PATENT DOCUMENTS 0 524 559 A2  1/1993  European Pat. Off. ........ H04L 27/38

OTHER PUBLICATIONS

Lee, Edward A. and David G. Messerschmitt, *Digital Communication* Chp. 9, "Adaptive Equalization," pp. 371–407, Kluwer Academic Publishers, 1988 1988.

Shanbhag, N.R. and Keshab K. Parhi, "Relaxed Look–Ahead Pipelined LMS Adaptive Filters and Their Application to ADPCM Coder," *IEEE Transactions On Circuits And Systems–II: Analog And Digital Signal Processing*, vol. 40, No. 12, Dec. 1993, pp. 753–766.

Patent Application Serial No. 08/430560, filed Apr. 28, 1995, titled "Phase–Loading Circuit For A Fractionally–Spaced Linear Equalizer," R.N. Shanbhag.

Patent Application serial no. 08/154197, filed Nov. 17, 1993, Titled "Data Recovery Technique Which Avoids a False Convergence State," Cathers, F.R. et al.

W. Y. Chen et al., "Design of Digital Carrierless AM/PM Transceivers," T1E1.4/92–149, Aug. 19, 1992.

J.D. Wang and J.J. Werner, Twenty–Second Annual Asilomar Conference on Signals, Systems, and Computers, Session MP3: "Communications Applications" in Pacific Grove, California, *On The Transfer Function Of Adaptive T/4 Equalizers*, Nov. 1, 1988, Maple Press.

Clark, Gregory A. et al, "Block Implementation of Adaptive Digital Filters," *IEEE Transactions of Acoustics, Speech, and Signal Processing*, vol. ASSP–29, No. 3, Jun. 1981, pp. 744–752.

*Primary Examiner*—Wellington Chin
*Assistant Examiner*—William Luthers

[57] ABSTRACT

Briefly, in accordance with one embodiment of the invention, an adaptive equalizer comprises: a digital filter including filter tap coefficients; a slicer; and a filter tap coefficient update block. The filter, slicer and coefficient update block are configured so as to perform at least one burst update of the filter tap coefficients. In accordance with another embodiment of the invention, a method of updating the filter tap coefficients of an adaptive equalizer comprises the step of: performing at least one burst update of the filter tap coefficients.

18 Claims, 3 Drawing Sheets

BURST UPDATE FOR AN ADAPTIVE EQUALIZER

CROSS-REFERENCE TO RELATED APPLICATION

This patent application is related to U.S. patent application Ser. No. 08/430,560, entitled "Initial Phase-Loading Circuit For a Fractionally-Spaced Linear Equalizer," filed Apr. 28, 1995, by N. R. Shanbhag, assigned to the assignee of the present invention and herein incorporated by reference.

TECHNICAL FIELD

The present invention relates to communications and, more particularly, to equalizers, such as may be employed in signal-modulation-based communication systems.

BACKGROUND OF THE INVENTION

Adaptive equalizers, such as fractionally-spaced linear equalizers (FSLEs) or symbol-spaced linear signal equalizers (SSLEs), may be employed to perform equalization of passband discrete signals, for example. FSLEs are described, for example, in *Digital Communication*, by Lee and Messerschmitt, available from Kluwer Academic Publishers, 1994, herein incorporated by reference. Such adaptive equalizers may be, for example, a component of a receiver for a broadband amplitude and/or phase-modulation-based communications system, such as a digital carrierless AM/PM (CAP) based system. One such application may include use in an asynchronous transfer mode local area network (ATM LAN) or in "fiber-to-the-curb" systems, for example.

One feature of an FSLE for a quadrature amplitude modulation (QAM) or, alternatively, a CAP-based system, for example, is that the FSLE may perform a "blind" start-up, referred to in this context as "blind equalization." More particularly, the FSLE does not need to employ a start-up or training sequence, as may typically be employed for other types of equalizers. Instead, the FSLE filter tap coefficients may be initialized to one out of L possible initial phases, where L is a positive integer greater than one. The FSLE value of L may be obtained as a ratio of the symbol period (T) to the sampling period (T') for the particular FSLE, where T is a multiple of T'.

As is well-known, adaptive equalizers, such as FSLEs or SSLEs, employ significant computational complexity and intensity to recover symbols at the receiving end of a communications system. A source of this computational complexity is related to updating the filter tap coefficients of the adaptive equalizer. A need therefore exists for reducing the computational intensity of the process of updating the filter tap coefficients of an adaptive equalizer.

SUMMARY OF THE INVENTION

Briefly, in accordance with one embodiment of the invention, an adaptive equalizer comprises: a digital filter including filter tap coefficients; a slicer; and a filter tap coefficient update block. The filter, slicer and coefficient update block are configured so as to perform at least one burst update of the filter tap coefficients. In accordance with another embodiment of the invention, a method of updating the filter tap coefficients of an adaptive equalizer comprises the step of: performing at least one burst update of the filter tap coefficients.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION

As previously indicated, adaptive equalizers, such as FSLEs and SSLEs, are well-known, such as described in the aforementioned text, *Digital Communication*, by Lee and Messerschmitt. Such adaptive equalizers have a variety of applications including, for example, passband equalization of discrete signals, although the scope of the invention is not limited in this respect.

Figure 3:
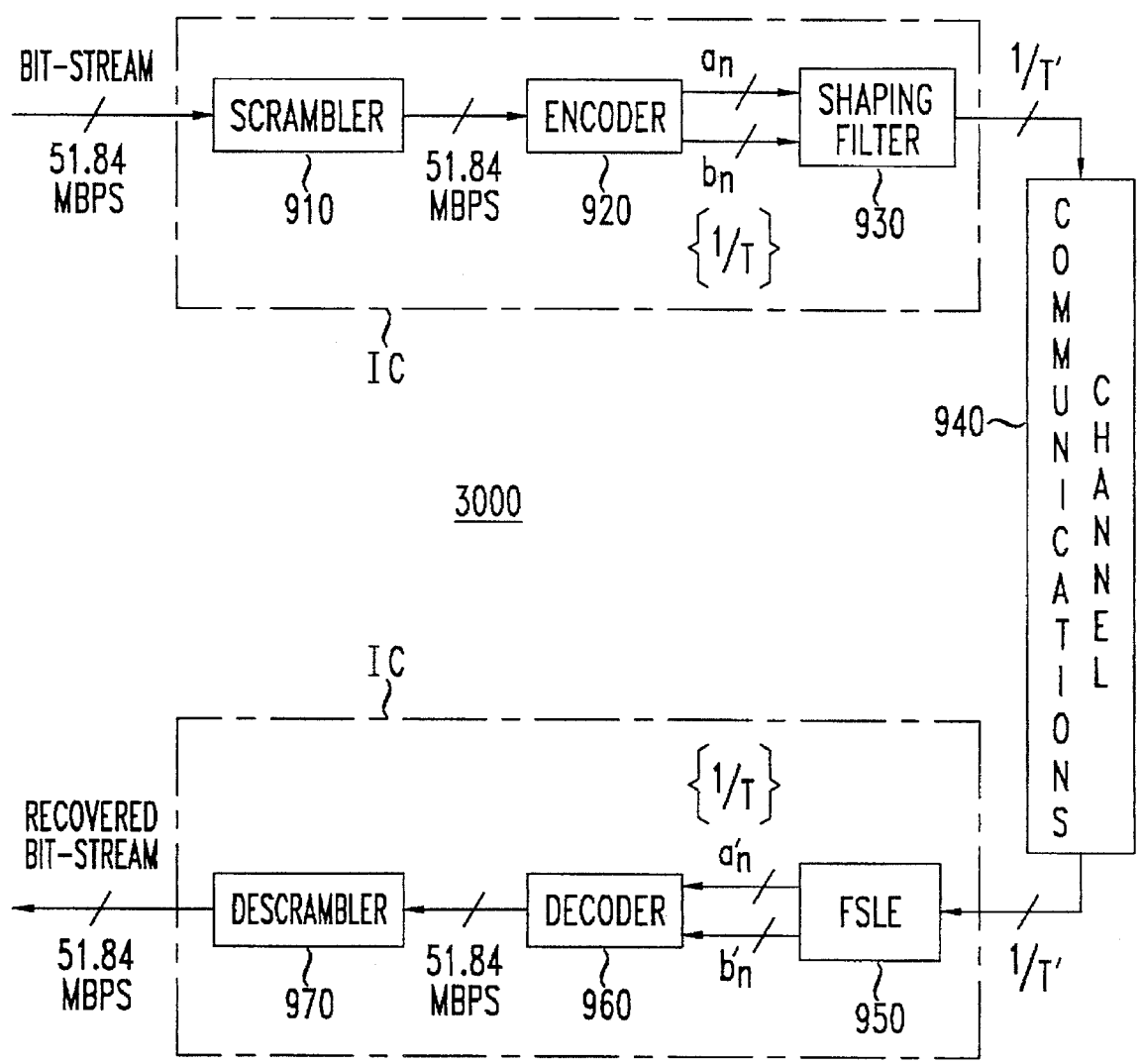
FIG. 3 is a schematic diagram illustrating an embodiment of a communication system that may employ an embodiment of an adaptive equalizer in accordance with the invention.

One example of an embodiment 3000 of a communication system that may employ an adaptive equalizer in accordance with the invention, such as FSLE 950, is illustrated by the schematic diagram of FIG. 3, although the invention is, of course, not limited in scope to use in such a system. As illustrated, communication system 3000 includes: a transmitting end comprising a scrambler 910, an encoder 920, and a shaping filter 930, and a receiving end comprising a FSLE 950, a decoder 960, and a descrambler 970. The transmitting end and receiving end communicate via a communications channel 940, such as may comprise twisted pair copper wires, a co-axial cable, or optical fibers, for example. The transmitter and receiver for the communication system may each be incorporated in an integrated circuit (IC) chip, although the invention is, of course, not limited in scope in this respect. Likewise, a single IC may incorporate both a transmitter and a receiver for such a communication system. A bit-stream to be transmitted is provided to scrambler 910 at the transmitting end. In this particular embodiment, for example, the bit-stream comprises a 51.84 megabit per second (Mbps) bit-stream, although the scope of the invention is not limited in this respect. The bit-stream may comprise, for example, video signals, audio signals, or data signals that have been segmented and reassembled as a bit-stream for transmission via communications channel 940, although the invention, again, is not limited in scope in this respect.

As is well-known for communication systems, the bit-stream may be scrambled by scrambler 910 using a pseudo-random signal processing technique, such as described, for example, in U.S. Pat. No. 4,304,962, titled "Data Scrambler," issued Dec. 8, 1981, by R. D. Fracassi and T. Tammaru, assigned to the assignee of the present invention and herein incorporated by reference. For example, in one embodiment, a boolean algebraic polynominal may be implemented, such as by digital logic gates. The signal resulting from this process may then be applied to encoder 920. Encoder 920 may implement any one of a number of signal modulation schemes, such as amplitude modulation, phase modulation, frequency modulation or a combination thereof. For example, a QAM- or CAP-based modulation scheme may be employed, although the invention is not limited in scope in this respect. As illustrated, encoder 920, in this particular embodiment of a communication system, provides discrete complex signal samples, $a_n+ib_n$, at a frequency of 1/T, referred to in this context as the "symbol frequency," to shaping filter 930. Although "i" is not explicitly illustrated in FIG. 3, the signal $b_n$ in FIG. 3 refers to the imaginary component of a complex discrete signal sample. The discrete signals provided by encoder 920 each represent a symbol to be transmitted via communications channel 940 in the form of a discrete signal in the Inphase-Quadarature (IQ) plane. Before transmission, however, the signal is "shaped" in the frequency domain by shaping filter 930, as illustrated. Shaping filter 930 in this particular embodiment effectively bandlimits discrete signals for transmission. Likewise, although not explicitly illustrated, there may be more than one shaping filter, such as separate filters for the inphase and quadrature components of the signal. As illustrated, the discrete signals transmitted via communications channel 940 have a frequency of 1/T', referred to in this context as the "sampling frequency," T being a multiple of T', as previously indicated. Of course, as is well-known, the discrete signals are converted to analog signals before transmission over the physical channel.

At the receiving end, FSLE 950 samples the received signals at 1/T', the sampling frequency, and produces discrete signals, $a'_n+ib'_n$ at 1/T, the symbol frequency. The discrete signals represent symbols that have been transmitted via channel 940. Decoder 960 decodes these discrete signals to provide a bit-stream, at 51.84 Mbps in this particular embodiment, and descrambler 970 descrambles this bit-stream by applying an inverse-pseudo random process with respect to scrambler 910 to provide the recovered bit-stream illustrated in FIG. 3. It will, of course, be appreciated that a SSLE may be employed in place of FSLE 950. For a SSLE, the symbol frequency and sampling frequency coincide.

Figure 4A:
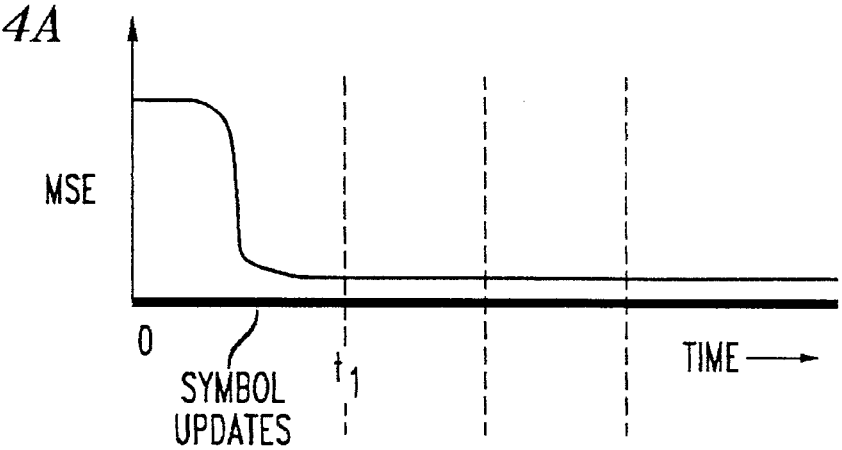
FIGS. 4A and 4B are plots illustrating, respectively, the mean squared error (MSE) for an adaptive equalizer employing symbol updates and for an embodiment of an adaptive equalizer in accordance with the invention.

As is well-known, an adaptive equalizer conventionally comprises a digital signal filter, a slicer, and a filter tap coefficient update block. In a conventional adaptive equalizer, filter tap coefficients may be updated every symbol period, which is referred to as "a symbol update" in this context. For such an adaptive equalizer FIG. 4A illustrates a plot of the mean squared error (MSE) as updates are performed every symbol period.

As is well-known, in a conventional adaptive equalizer, discrete input signals are received by the digital filter of the adaptive equalizer. The digital filter processes the received discrete input signals and produces an output signal. The discrete output signals are received by the slicer, which generates an error signal based upon the discrete output signal produced by the digital filter. This error signal is provided to a filter tap coefficient update block, which uses the error signal produced by the slicer to adaptively update the filter tap coefficients of the digital filter. As previously indicated, in a conventional adaptive filter, this update is performed every symbol period. The embodiment of an adaptive filter in accordance with the invention illustrated in FIG. 1 has the capability to operate so as to perform a symbol update as just described, at least for an extended time. For example, the symbol update may be performed for a substantially predetermined time. However, the embodiment illustrated in FIG. 1 has an additional capability to operate so as to perform one or more burst updates.

Figure 1:
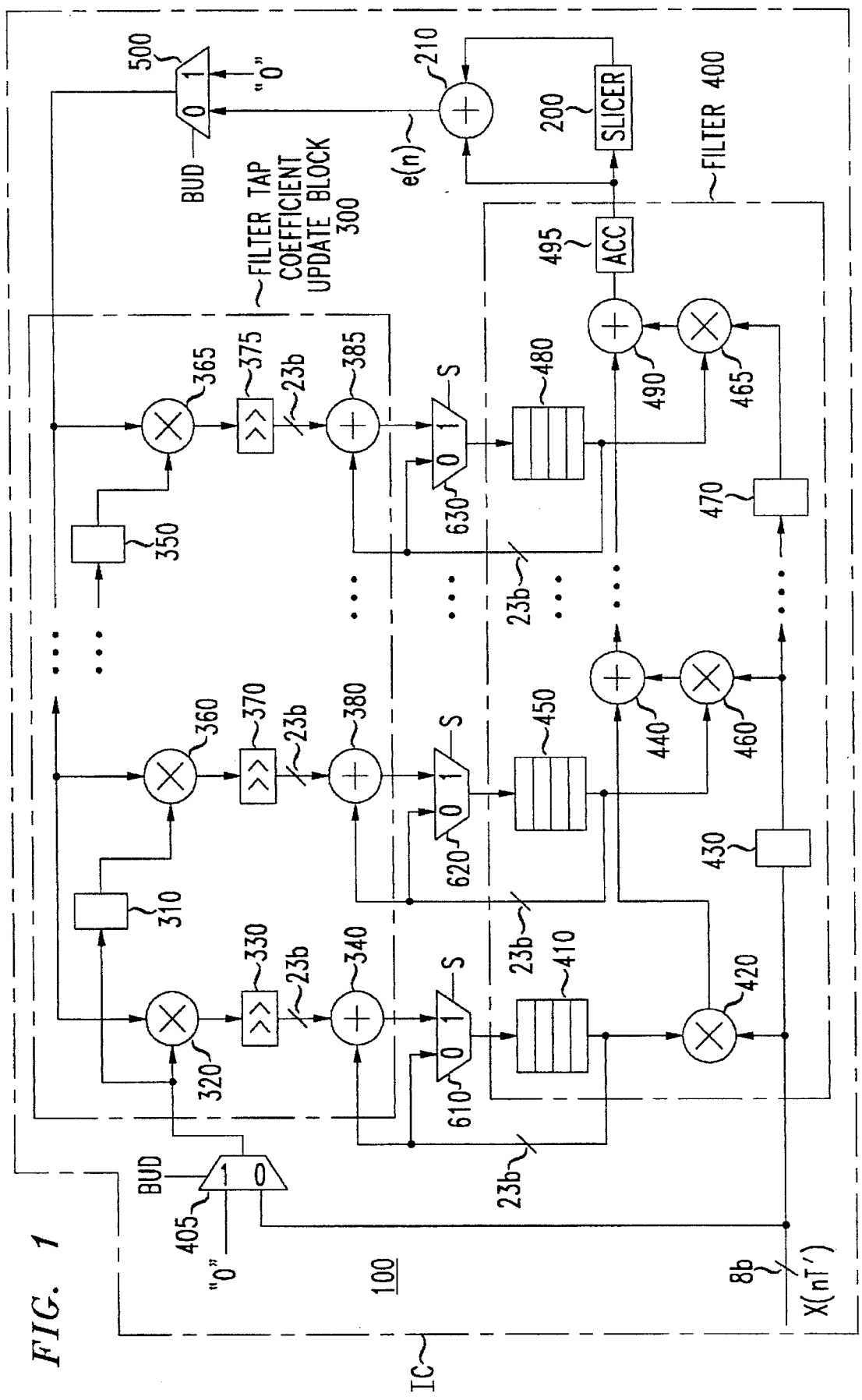
FIG. 1 is a schematic diagram illustrating one embodiment of an adaptive equalizer in accordance with the invention.

FIG. 1 is a block diagram illustrating embodiment 100 of an adaptive equalizer in accordance with the invention. As illustrated in FIG. 1, embodiment 100 comprises an FSLE, although the invention is not limited in scope in this respect. For example, alternatively, a SSLE may be employed in which the symbol frequency and sample frequency coincide. FSLE is illustrated in FIG. 1 as embodied on an integrated circuit chip, although, again, the invention is not limited in scope in this respect. Embodiment 100 includes a digital filter 400, a slicer 200, and a filter tap coefficient update block 300. In embodiment 100, the filter, slicer, and coefficient update block are configured so as to perform at least one burst update of the filter tap coefficients, as explained in more detail hereinafter.

In this context "a burst update" refers to an update of the filter tap coefficients for L-consecutive symbol periods out of H symbol periods, where H is greater than L, and H and L are positive integers. For the adaptive equalizer illustrated in FIG. 1, if M=T/T', where T is the symbol period, T' is the sample period, and M is a positive integer, then assume, only for the purpose of illustration, that M=4, although the invention is not limited in scope in this respect. In general, for a FSLE, M may be a positive integer greater than one. Likewise, for a SSLE, M should be one.

Figure 4B:
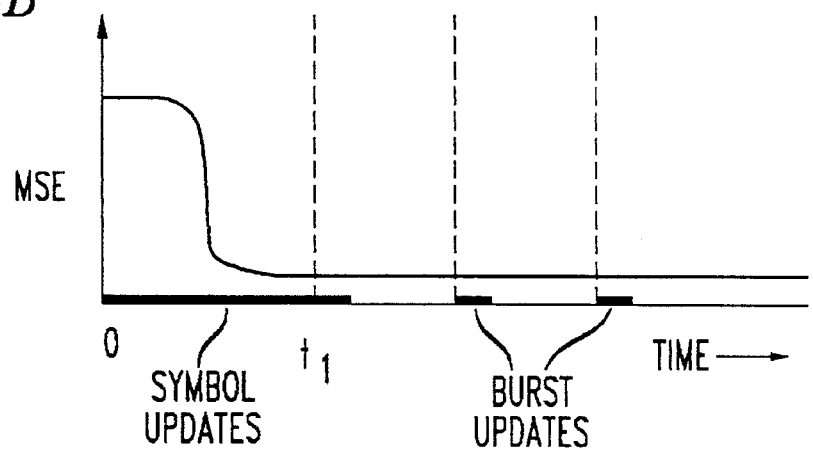

FIG. 4B illustrates the mean squared error (MSE) for an adaptive filter in which initially symbol updates are performed and later burst updates are performed. As illustrated in FIGS. 4A and 4B, until time or $t=t_1$, the two update schemes provide essentially identical mean squared errors. However, after an initial period of convergence, a burst update involves updates in a burst of L consecutive symbols per H symbol periods. This is illustrated in FIG. 4B by the heavy line along the horizontal axis. Such burst updates may be performed by an adaptive equalizer in accordance with the invention, such as the embodiment illustrated in FIG. 1. Likewise, as illustrated in FIG. 4B, an advantage of an adaptive equalizer in accordance with the invention is that after initial convergence, the mean squared error may be kept relatively low without performing a symbol update, that is, without performing an update of the filter tap coefficients every symbol period.

As illustrated in FIG. 1, embodiment 100 includes a digital filter 400, a filter tap coefficient update block 300, a slicer 200 and some additional components so that the filter, slicer and coefficient update block may be configured so as to perform at least one burst update of the filter tap coefficients. As illustrated, filter 400 includes: registers, such as 430 and 470; multipliers, such as 420, 460 and 465; and adders, such as 440 and 490. Likewise, the partial products generated by digital filter 400 are accumulated in accumulator 495 in this particular embodiment before being provided to slicer 200. Accumulator 495 is employed in this embodiment at least in part because filter 400 comprises a FSLE. Accumulator 495 accumulates discrete output signals generated at the sample frequency and produces discrete output signals for slicer 200 at the symbol frequency. The discrete output signals of the filter are provided to slicer 200, which produces recovered symbols based at least in part on the discrete output signals provided by digital filter 400. Likewise, the discrete output signals and recovered symbols are compared by adder 210 so as to produce an error signal, designated e(n) in FIG. 1. Of course, although not explicitly illustrated, one of the two signals provided may be complemented in order to generate the error signal. As illustrated in FIG. 1, this error signal may be provided to filter tap coefficient update block 300 via multiplexer (MUX) 500. In this particular embodiment, the operation of MUX 500 is controlled by digital control signal "BUD," as explained in more detail hereinafter. As illustrated in FIG. 1, in situations in which MUX 500 provides error signal e(n), based at least in part on signal BUD, this error signal may be provided to filter tap coefficient update block 300. Thus, the error signal may be provided to multipliers, such as multipliers 320, 360 and 365, as illustrated in FIG. 1. Likewise, the error signal may be multiplied by a discrete input signal, where, in this particular embodiment, the discrete input signal may be provided to the filter tap coefficient update block 300 via MUX 405. As with MUX 500, MUX 405 in this embodiment is controlled by digital control signal "BUD," as explained in more detail hereinafter. In situations in which the input signals are provided via MUX 405 to update block 300, again based at least in part as signal BUD, the discrete input signals may be multiplied by the error signal and provided in this embodiment to shifters, such as shifters 330, 370 and 375. In a filter tap coefficient update block, conventionally multiplication of the error signal and the discrete input signal is performed. However, in an embodiment in which binary digital signals are employed, such as the embodiment illustrated in FIG. 1, the multipliers may be implemented as binary shifters because shifting is mathematically equivalent to multiplication or division by a power of 2, depending in the amount and direction of the shift of the binary digital signal. Of course, the invention is not limited in scope to employing shifters in place of multipliers. As illustrated, the output signal produced by the shifters is 23 bits in comparison with an 8-bit discrete input signal, although, of course, the invention is not restricted in scope to signals having these particular bit lengths. Additional bits are provided to ensure that sufficient additional signal precision is employed to perform filter tap coefficient updates. The amount of shifting to be applied in order to perform the update of the filter tap coefficients may vary and is a known process, referred to in this context as "gear shifting." For example, this process is described in *Data Communications Principles*, by R. D. Gitlin, J. F. Hayes, and S. B. Weinstein, available from Plenum Press, New York (1992), herein incorporated by reference, and also in the aforementioned text, *Digital Communication.* Likewise, registers, such as registers 310 and 350 in this embodiment, operate as delay elements to store the discrete input signals to ensure that the filter tap coefficients are appropriately updated in accordance with the desired adaptive processing.

As illustrated in FIG. 1, updated filter tap coefficients are provided via a MUX, such as MUXes 610, 620 and 630, to register banks, such as register banks 410, 450, and 480, which store updated filter tap coefficients to be employed by discrete filter 400. In this embodiment, banks of four registers are employed because M=4 for this FSLE. This particular implementation reduces the number of multipliers by a factor of 4, although the scope of the invention is not restricted to this particular implementation. In this embodiment, each multiplier, such as 420, 460 and 465, may be employed to implement four taps in operation due to the relationship between the symbol frequency and the sample frequency. Thus, in each bank of registers, a separate register is employed for each filter tap coefficient implemented by the corresponding multiplier. In a SSLE implementation, a single register would typically replace each bank because each multiplier would implement a single filter tap in operation. As illustrated in FIG. 1, the operation of MUXes 610, 620 and 630 are controlled by digital control signal "START," designated "S" in FIG. 1, as explained in more detail hereinafter. As illustrated in FIG. 1, the updated filter tap coefficients are likewise fed back to an adder, such as adders 340, 380 and 385, so that the updated filter tap coefficients may, if desired, be continually updated by additional processing performed by filter tap coefficient update block 300 and the resulting additionally processed updated filter tap coefficients may replace the previous updated filter tap coefficients stored in the register banks, such as register banks 410, 450, and 480. As illustrated, however, the additionally processed updated filter tap coefficients are provided to the registers via a MUX, such as MUXes 610, 620 and 630, based at least in part on control signal START.

For the embodiment illustrated in FIG. 1, the presence of MUXes 405, 500, 610, 620 and 630 and control signals "BUD" and "START" provide the capability for the adaptive equalizer illustrated in FIG. 1 to perform a burst update instead of continuing with a symbol update. Once the mean squared error of the adaptive equalizer reaches an acceptable level, as indicated by FIG. 4B, the START control signal may be switched from a high state to a low state. It will, of course, be appreciated that the invention is not limited in scope to the particular signaling conventions employed in this embodiment. Likewise, after an appropriate time has elapsed, the BUD control signal may be switched from a low state to a high state. For the embodiment illustrated in FIG. 1, the effect of changing control signal START from a high to a low state is to disable the capability to update filter tap coefficients for digital filter 400. As illustrated in FIG. 1, instead of continuing to update the filter tap coefficients using the signals produced by update block 300, the contents of register banks 410, 450, and 480 are fed back into the respective register banks via MUXes 610, 620 and 630, respectively. Likewise, the effect of changing control signal BUD from a low state to a high state is to disable the processing portion of update block 300. More particularly, the discrete input signals and the error signals provided to block 300 are "zeroed" due to the operation of MUXes 405 and 500. The advantage of disabling the capability of update block 300 to update the filter tap coefficients is that significant power savings may result. For example, for an adaptive equalizer implemented using CMOS circuitry, power savings are realized, at least in part, because a significant portion of the power consumption for CMOS devices occurs by causing the CMOS devices to change state. Likewise, control signals BUD and START may be employed to perform burst updates of the filter tap coefficients periodically so that the mean squared error may be kept at an appropriate level while these power savings are realized.

Figure 2A:
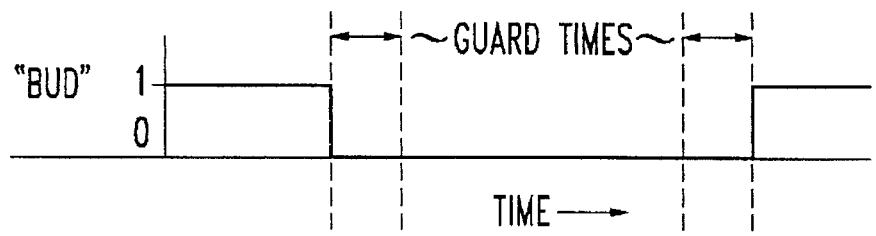
FIGS. 2A and 2B are diagrams illustrating the timing relationship of digital control signals "START" and "BUD," such as may be employed for the embodiment illustrated in FIG. 1.
Figure 2B:
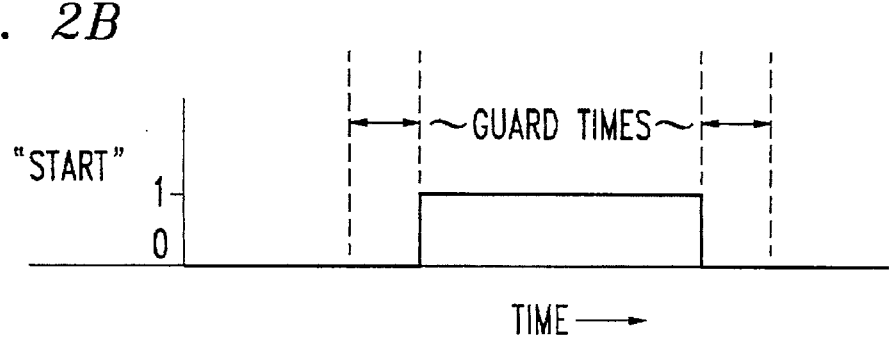

FIGS. 2A and 2B are timing diagrams illustrating the relationship of the BUD and START control signals for the embodiment illustrated in FIG. 1. Once the filter tap coefficient update block is disabled, control signals are applied so that L consecutive symbol period updates take place every H symbol periods, where L is smaller than H and L and H are positive integers. As illustrated in FIG. 2, during the L symbol periods in which the filter tap coefficients are updated, the START control signal is set high. Likewise, the BUD control signal is set low during this period; however, the BUD control signal continually remains set low beginning with a time prior to the time in which the START signal changes state from low to high and the BUD signal remains low during a time after which the START control signal changes state from high back to low, as illustrated in FIG. 2. It is desirable that the length of these respective "guard times" for the BUD signal each be equal to or greater than the time required for the adders, such as 340, 380 and 385, to have a valid discrete output signal. For example, for the first "guard time," once that time period has elapsed, the START control signal may be set high, which will activate the coefficient update scheme so that updated filter tap coefficients may be provided to filter 400.

As is well-known, an advantage of an adaptive equalizer includes the capability to reduce or suppress intersymbol interference (ISI). However, yet another advantage of an adaptive equalizer configured so as to perform a burst update of the filter tap coefficients is that such an approach may be used to suppress cyclostationary interference, such as may be present in near end cross talk (NEXT). This type of interference, for example, may be exhibited in connection with ATM-LAN systems or any other system employing a multipair bundled cable.

The embodiment of an adaptive filter illustrated in FIG. 1 has a capability to operate so as to perform a symbol update at least for an extended time so that initial convergence of the mean squared error may take place, as illustrated in FIG. 4B, before the adaptive equalizer operates so as to perform a burst update. However, alternatively, two adaptive equalizers may be employed, one which operates so as to perform a symbol update at least for an extended time and another which operates so as to perform burst updates. Likewise, instead of providing control signals so that the discrete input signals and the error signals provided to the filter coefficient update block are "zeroed," alternatively, an adaptive equalizer in accordance with the invention may be configured so as to perform at least one burst update of the filter tap coefficients by employing a separate clock for the filter tap coefficient update block and zeroing the clock, for example. Likewise, other power saving approaches of performing a burst update in accordance with the invention may be employed.

An adaptive equalizer in accordance with the invention, such as the embodiment illustrated in FIG. 1, may be operated in accordance with the following method. A symbol update of the filter tap coefficients may be performed at least for an extended time. For example, discrete input signals may be received, such as by filter 400, and then processed to produce a discrete or digital filter output signal. The output signal may be provided to a slicer, such as a slicer 200, and the slicer may produce an error signal as an output signal. That error signal may be provided to a filter tap coefficient update block, such as filter tap coefficient block 300. For the embodiment illustrated in FIG. 1, for example, the error signal may be provided via a MUX, such as MUX 500. The error signal may then be employed to update the filter tap coefficients, such as in accordance with the following equation:

$$W(n)=W(n-1)+\mu.e(n).X(n) \qquad [1]$$

where $W(n)$ denotes a vector of filter tap coefficients, n denotes an arbitrary time index, $\mu$ denotes the adaption step-size, $e(n)$ denotes the error signal, and $X(n)$ denotes a vector of discrete input signals. Thus, a symbol update of the filter tap coefficients may be performed at least for an extended time. Eventually, the error signal produced by the slicer, such as slicer 200, may reach an acceptable level of mean squared error. This level may be determined by a variety of techniques, such as waiting a substantially predetermined period of time, or waiting for an acceptable substantially predetermined error level to be reached. After reaching this acceptable level of mean squared error, for example, the symbol update of the filter tap coefficients is no longer performed. As previously described for the embodiment illustrated in FIG. 1, the symbol update is disabled by providing control signals to MUXes 405, 500, 610, 620, and 630, for example. The effect of these control signals is to "zero" the discrete signals provided to filter tap coefficient update block 300 as input signals and to "zero" the discrete signals provided to block 300 as error signals. Likewise, at least one burst update may later be performed, as previously described, such as by providing control signals START and BUD where guard times are employed, as illustrated in FIG. 2. Likewise, burst updates of the filter tap coefficients may be performed periodically to ensure the mean squared error remains at an acceptable level.

While only certain features of the invention have been illustrated and described herein, many modifications, substitutions, changes or equivalents will now occur to those skilled in the art. It is, therefore, to be understood that the appended claims are intended to cover all such modifications and changes as fall within the true spirit of the invention.

The invention claimed is:

1. An adaptive equalizer that uses non-training data for updating filter tap coefficients, comprising:

a digital signal filter including the filter tap coefficients;

a slicer; and a filter tap coefficient update block;

said filter, said slicer and said filter tap coefficient update block being configured so as to perform at least one burst update of said filter tap coefficients during symbol periods, wherein update of the filter tap coefficients is disabled when the at least one burst update is not occurring.

2. The method of claim 1, and further comprising, prior to the step of performing the at least one burst update, the step of:

performing a symbol update of said filter tap coefficients at least for an extended time.

3. The method of claim 2, wherein the step of performing a symbol update is performed until an acceptable mean squared error signal level is produced by said slicer.

4. The method of claim 3, wherein the step of performing a symbol update is performed for a substantially predetermined time.

5. The method of claim 1, wherein burst updates of said filter tap coefficients are performed periodically, said at least one burst update being one of the periodically performed burst updates.

6. A communication system, comprising:

a receiver including an adaptive equalizer that uses non-training data for updating filter tap coefficients, said adaptive equalizer including:

a digital signal filter including the filter tap coefficients, a slicer, and a filter tap coefficient update block, said filter, said slicer and said filter tap coefficient update block being configured so as to perform at least one burst update of said filter tap coefficients during symbol periods, wherein update of the filter tap coefficients is disabled when the at least one burst update is not occurring.

7. The communication system of claim 6, wherein said communication system comprises a communication system employing a CAP-based signal modulation scheme.

8. The communication system of claim 6, wherein said communication system comprises a communication system employing a QAM-based signal modulation scheme.

9. The communication system of claim 6,
wherein said communications channel comprises a communications channel selected from the group consisting essentially of twisted-pair copper wires, a co-axial cable, and optical fibers.

10. The communications system of claim 6,
wherein said filter, slicer, and coefficient update block are further configured so as to perform a symbol update of said filter tap coefficients at least for an extended time.

11. An integrated circuit, comprising:
an adaptive equalizer of the integrated circuit that uses non-training data for updating filter tap coefficients, including:
a digital filter,
a slicer, and
a filter tap coefficient update block, said filter, said slicer, and said filter tap coefficient update block being configured so as to perform at least one burst update of said filter tap coefficients during symbol periods, wherein update of the filter tap coefficients is disabled when the at least one burst update is not occurring.

12. The integrated circuit of claim 11,
wherein said filter, slicer, and coefficient update block are further configured so as to perform a symbol update of said filter tap coefficients at least for an extended time.

13. The integrated circuit of claim 11,
wherein the extended time comprises a substantially predetermined time.

14. A method for updating filter tap coefficients of an adaptive equalizer that uses not-training data for updating filter tap coefficients, comprising the step of:
performing at least one burst update of said filter tap coefficients during symbol periods, wherein update of the filter tap coefficients is disabled when the at least one burst update is not occurring.

15. The adaptive equalizer of claim 14,
wherein said digital signal filter comprises a digital filter selected from the group consisting essentially of a fractionally-spaced linear equalizer (FSLE) digital filter and a symbol-spaced linear equalizer (SSLE) digital filter.

16. The adaptive equalizer of claim 14,
wherein said filter, slicer, and coefficient update block are configured in a configuration comprising means for performing the at least one burst update of said filter tap coefficients.

17. The adaptive equalizer of clam 14,
wherein said filter, slicer and coefficient update block are further configured so as to perform a symbol update of said filter tap coefficients at least for an extended time.

18. The adaptive equalizer of claim 17,
wherein the extended time comprises a substantially predetermined time.

\* \* \* \* \*